United States Patent Office 2,958,683
Patented Nov. 1, 1960

2,958,683
COPOLYMERS OF OCTAFLUOROCYCLOHEXA-1,3-DIENE

William Hopkin and Anthony Kenneth Barbour, Avonmont, England, assignors to The National Smelting Company Limited, London, England No Drawing. Filed Sept. 15, 1958, Ser. No. 761,267

Claims priority, application Great Britain Sept. 18, 1957

9 Claims. (Cl. 260—82.1)

This invention relates to halogen-containing polymers, particularly fluorine-containing copolymers.

Because of the extraordinary stability of polyfluoro organic compounds to chemical attack, e.g. by air at elevated temperatures and to combustion or by strongly oxidising or acidic materials, and to degradation by extremes of temperature, these materials have found favour as fluids, greases, plastics and elastomers in situations where such extreme conditions operate, such as in and around furnaces, aero-engines and in chemical plant of many kinds. In such conditions their extraordinary stability and resistance to degradation or chemical attack makes possible the design of apparatus otherwise impossible, or which is more reliable in long unattended service, or which is more compact, or which is more efficient because of the high operating temperatures possible with their use. One particular example only is in the manufacture of electric motors or transformers in which the limiting factor is frequently the life of the insulation rather than the structure of the apparatus itself. Examples of such excellent materials are chlorotrifluoroethylene polymeric oils and plastics, tetrafluoroethylene polymer resins and various elastomers derived from these two compounds.

It is, however, advantageous to have alternative materials available which, for one reason or another, may be used where particular conditions operate. One object of this invention is to prepare such materials.

It has been discovered that two compounds, which may conveniently be referred to as the polyfluoro cyclic olefins, exhibit extraordinary reactivity in polymerisation systems, and make possible the preparation of polymers of completely different structure from those hitherto available. The reasons for such reactivity are as yet unknown. Their structures have been elucidated as follows:

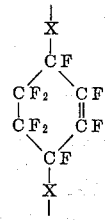

Octafluoro-cyclo-hexa-1 : 3 diene

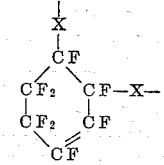

Octafluoro-cyclo-hexa-1 : 4-diene

The structure of the combined forms of these compounds is not certainly known, but may be deduced from the well established prior knowledge of many other polymers to be as follows, where X represents each adjacent co-monomer unit of the polymeric chains.

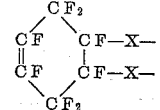

1 : 4-combined, 1 : 3-diene

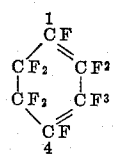

1 : 2-combined, 1 : 3-diene

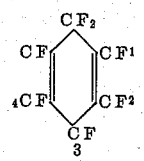

1 : 2-combined, 1 : 4-diene

The two combined forms of the 1:3-diene are postulated only by analogy with the well established modes of combination of linear hydrocarbon dienes, such as 1:3-butadiene. It is very difficult to establish the exact structure—all 1:4-addition, all 1:2-addition, or various proportions of each—and it is as yet unknown. Other less important possibilities are cis- or trans-orientation of the "X" units with respect to each other—the trans- form may be more probable in each case.

Regardless of the exact mode of combination, it is apparent that the combined form in each case gives essentially a disubstituted polyfluoro-cyclo-hexene, each differing, one from another, only in the places of substitution.

The invention consists of a co-polymer of a polymerisable unsaturated monomer with either or both of the cyclic polyfluorinated di-olefins, octafluoro-cyclo-hexa-1:3-diene or the isomeric octafluoro-cyclo-hexa-1:4-diene.

The reactivity of these two polyfluoro cyclic olefins is extraordinary, particularly that of the 1:3-diene. Almost certainly because of its conjugated unsaturation, which is well known to stabilise by the provision of delocalisation energy the free radicals formed during reaction, it exhibits high reactivity in adding to radicals, forming what is essentially its own radical. This in turn exhibits a high reactivity toward many monomers of widely differing structure. Regarding it as monomer 2 in the convention of the kinetics of copolymerisation reactions, the value of the constant $k_{12}$ is apparently nearly always very high, whereas $k_{21}$ apparently varies somewhat more but is frequently also very high. However, since neither of these polyfluoro cyclic olefins can polymerise by itself to any marked extent, the constant $k_{22}$ (consequently $r_2$), and the probability of contiguous units of these olefins in a polymer chain are very close to zero. A particular example which demonstrates the reactivity of the 1:3-diene is the copolymerisation with the hydrocarbon 1:3-butadiene. Under comparable conditions at 50° C. in an emulsion system, butadiene homopolymerises slowly, requiring many hours to attain high polymer conversions, whereas in the presence of considerable proportions of octafluoro-cyclo-hexa-1:3-diene, reaction is extremely fast, can take place in minutes rather than hours, and the copolymer produced has a composition approaching the maximum fluorocarbon content of 50 moles percent. An approximate determination of the reactivity ratios gave $r_1=0.04\pm0.02$, with $r_2$ assumed to equal zero. Thus $k_{12}$ is 20–50 times greater than $k_{11}$ and, as demonstrated by reaction rate and copolymer compositions, the constant $k_{21}$ must be of a similar order to $k_{12}$.

The range of comonomers with which these polyfluoro-olefins copolymerise is wide and embraces a number of types which may be said to be typical of the majority of monomers capable of homopolymerisation. Thus, ethylene and substituted ethylenes are tangibly represented, by ethylene, vinyl chloride, vinyl acetate and vinylidene fluoride. Conjugated unsaturated monomers are similarly represented by the straight chain 1:3-butadiene for its many derivatives, by styrene for vinyl aromatic compounds and by ethyl acrylate, methyl methacrylate and acrylonitrile for $\alpha$-$\beta$ unsaturated acid derivatives. More specifically, the range of comonomers may be further exemplified for general guidance, and not as delineation of the scope of this invention, as follows.

ETHYLENES

Ethylene, vinyl fluoride, chloride, bromide and iodide, vinylidene, fluoride, chloride, chlorofluoride, bromide and iodide, vinyl trimethyl silane, vinyl trichlorosilane.

VINYL AND ALLYL ESTERS

Vinyl acetate, trifluoroacetate, propionate, butyrate, heptafluorobutyrate pentanoate, octanoate, pentadecafluoro-octanoate, benzoate, sulphate, phosphate, silicate and many other acid esters including those of polybasic acids, such as divinyl phthalate and sebacate, trivinyl aconitate, similar allyl esters, and tri-allyl cyanurate.

LINEAR CONJUGATED DIENES

1:3-butadiene, isoprene, fluoroprene, chloroprene, 1:1-difluoro-, 1:1:2-trifluoro, 1:1:3-trifluoro- and 1:1:4:4-tetrafluoro-butadiene.

VINYL AROMATIC COMPOUNDS

Styrene, ar-monochloro-, polychloro-, bromo- and methoxy styrene, the vinyl toluenes, the divinyl benzenes, the vinyl naphthalenes, m-vinyl phenol, vinyl benzoic and benzene sulphonic acids, the vinyl pyridines, N-vinyl carbazole.

$\alpha$-$\beta$ UNSATURATED ACID DERIVATIVES

Ethyl, methyl propyl, butyryl, octyl, cyclo-hexyl, phenyl, 2:2:2-trifluoroethyl, 1:1-dihydroheptafluorobutyryl, 1:1-dihydro-undecafluorohexyl, 1:1-dihydropentadecafluoro-octyl, 2:2:3:3-tetrafluoropropyl, 1:1:5-trihydro-octafluoropentyl, 1:1:7-dodecafluoroheptyl acrylates, $\alpha$-chloro acrylates, $\alpha$-methyl acrylates and $\alpha$-trifluoromethyl acrylates, acrylonitrile, methacrylonitrile, vinylidene cyanide, trifluoromethacrylonitrile, diethyl fumarate, acrylic, methacrylic, trifluoromethacrylic acids. Esters of glycols and glycerol with these acids may also be used.

VINYL ETHERS

Vinyl ethers of the common hydrocarbon, fluorocarbon chlorofluorocarbon alcohols.

"MIXED" MONOMERS

Monomers which contain two or more differently functional unsaturated polymerisable groups, such as vinyl acrylate, $\alpha$-chloracrylate, methacrylate, etc., ar-vinyl vinyl benzoate ($CH_2=CH.C_6H_4COOCH=CH_2$), ar-vinyl phenyl acrylate ($CH_2=CH.C_6H_4O.COCH=CH_2$), etc.

In fact, such is the range of monomer types which have been successfully copolymerised with these cyclic fluorinated dienes, that it is not unreasonable to deduce that any unsaturated monomer capable of free radical homopolymerisation may be employed as a comonomer with the cyclic fluorinated dienes. It is also apparent that more than one of these unsaturated comonomers may be employed in conjunction with either or both of these cyclic fluorinated dienes in order to make terpolymers etc., with particular properties.

The invention further consists in a method of preparing a copolymer in which a polymerisable unsaturated monomer is reacted with octafluoro-cyclohexadiene.

The methods used to prepare such copolymers are well known to those skilled in the art, and include so-called mass polymerisation carried out in the absence of any solvent, solution polymerisation, carried out in a suitable solvent, vapour phase polymerisation, and dispersion and emulsion polymerisation. The last two are generally carried out using water as the immiscible continuous phase though other such liquids, e.g. fluorocarbons such as perfluoromethylcyclohexane, may be used to provide the required immiscible phase. The choice depends on the solubility of the relevant monomers in them, and on cost, etc. Control of copolymer composition by addition of monomer to the system during reaction may be necessary.

Depending on the comonomers which are to be used and on the reaction conditions an added initiator may or may not be necessary. When necessary, any free radical generator may be employed such as inorganic peroxides including hydrogen peroxide, metal peroxides in conjunction with acids, per-salts, etc., or organic peroxides such as benzoyl, acetyl, trichloroacetyl and heptafluorobutyryl peroxides, hydroperoxides such as the mono- or poly-isopropylbenzene mono- or poly-hydroperoxides, tert-butyl hydroperoxide, p-menthane hydroperoxide, dialkyl peroxides such as di-tert-btuyl and di-cumyl peroxides and so on. Azo compounds may also be used, in particular azo-bis-isobutyronitrile and triphenylmethylazobenzene, or nitroso compounds such as N-nitroso-acetanilide. Substances which can be dissociated into free radicals by light may be employed, if required, either as sensitisers for the induced decomposition, for example of a peroxide, or as initiators in their own right. As a photosensitiser, benzil may be used, for example, or many other similarly reactive compounds. As photo-initiator, the monomers themselves may suffice, or the initiators already suggested may be employed with the appropriate choice of wavelength of the incident light. Also useful are the many compounds which can be dissociated by light into free radicals though not normally regarded as initiators since, generally their thermal dissociation requires an inconvenient temperature range. Examples of these include ketones (e.g. hexafluoro-acetone) halides (e.g. carbon tetrabromide trifluoromethyl iodide, dibromodifluoromethane) and so on.

The choice of initiating system depends primarily on the temperature range in which the reaction is required to be carried out and to this end, one or more of the preceding initiators may be found to be suitable. However, it is often convenient to use a system in which the initiator is being used below its normal useful temperature range. For example, below about 50° C., persulphates (in aqueous systems) and benzoyl peroxide have inconveniently low rates of decomposition. It is customary to enhance this rate by the addition of an activator or activators to the system to induce the generation of the required free radicals at a convenient rate for reaction at these lower temperatures. Such activators may be employed in the processes of this invention. As examples of these may be quoted persulphates with sulphite, bisulphite or metabisulphite with or without the addition of a heavy metal ion (e.g. iron, silver, cobalt) to enhance still further this rate of radical generation, or iso-propyl benzene hydroperoxide with sugars, phosphate and ferrous ions, or benzoyl peroxide with dimethyl aniline or cobalt napthenate. In fact any of the known means of such enhancement of the free radical generation may be used. Particularly useful are the so-called "cold rubber" recipes developed for the copolymerization of styrene with butadiene at temperatures as low as −20° C. Many examples of these may be found in the chemical literature, e.g. in "High Polymers, vol. IX—Emulsion Polymerisation," by Bovey, Kolthoff, Medalia and Meehan; Interscience Publishers, New York, 1955. The use of photo-sensitisers and photo-induced free radical generation, already referred to, may be included in the category of "activated" polymerisation since the photolysis induces such generation at temperatures below those normally employed with the particular reagent.

Another means by which low temperature reaction may be initiated is by the use of high energy radiation such as produced by a linear accelerator or by radioactive elements.

A further type of additive which may be employed in these systems is the so-called modifier, or chain transfer agent by which the molecular weight of the polymer is reduced deliberately to enhance certain properties such as flow of the melt or freedom from gel copolymer in the case of copolymers with such as butadiene, or even to produce liquid or waxy copolymer. Common chain transfer agents are the higher mercaptans (e.g. the dodecylmercaptan) alkyl halides e.g. carbon tetrachloride, chloroform, trifluoro-iodomethane, 1:2-dichloro-1:1:1-trifluoro-iodoethane and hydrocarbons with labile hydrogen atoms, such as pentaphenyl ethane, iso-propylbenzene and triphenyl methane.

In emulsion polymerization systems, such surface-active agents as well known to the art may be used to effect the necessary near-colloidal dispersion. Particularly useful are the fatty acid soaps, alkyl and alk-aryl sulphate and phosphate ester, aryl or alk-aryl sulphonates, polyethers, and quaternary ammonium soaps well known and readily available commercially. Particular properties of inertness are sometimes required in the emulsifiers and are supplied by the alkali metal salts of polyfluoro acids such as the ω-H monohydroperfluoro-pentanoic, heptanoic and nonanoic acids, perfluoro-hexanoic, octanoic and decanoic acids and of the polychlorofluoro acids known as "Kel-F" acids (registered trademark, Minnesota Mining and Manufacturing Company Limited) of general formula $$Cl(CF_2CFCl)_nCF_2COOH$$

where $n$ is an integer from 3 to 5 for the most useful properties. Still other additives may be lubricants, pigments, dyes, stabilisers, etc.

The temperature of reaction is dictated by convenience and by the molecular weight range required for the copolymer but for convenience, the range −20° C. to +250° C. will fulfill most purposes though considerably lower temperatures may be employed using, for example, high energy or photo-activated initiation. Higher temperatures may also be used as long as they are not too near the decomposition temperatures.

The vessels in which the reactions are carried out are well known. Since the reactions as a matter of principle are best carried out in the absence of any substantial quantity of molecular oxygen, particularly in the case of copolymers of the octafluoro-cyclo-hexa-1:3-diene which is readily oxidised and the products hydrolysed by water, the polymerisations are best carried out in a sealed system. The pressure of the system is conveniently autogenous, but it may be necessary in the case of monomers being reacted above their critical temperatures to increase the pressure by compression. The extent to which this pressure may be raised is limited by the nature of the products required and by the apparatus available, but there is no reason, other than that of the strength of the containing vessel, why it should not be as high as several thousand atmospheres, or higher.

The vessels in which the reactions are to be carried may be conventional autoclaves equipped with stirrers, etc. for batchwise reaction, or coil or tube reactors for continuous reaction or any specially suitable apparatus. The normal engineering requirements apply, and inertness of the materials of construction is advisable by the use of glass, glassed steel, stainless steel, noble metals, etc.

The products of the copolymerisations may be liquids, greases, waxes, brittle resinous solids, thermoplastic resins or elastomers. Particularly useful are the polymers of low and of high molecular weight. The liquid, greasy or waxy copolymers may be used as lubricants, pressure transmission fluids, dielectrics and impregnants of low flammability and considerable chemical and temperature stability. The resinous solids may be used for impregnation of supporting media such as glasscloth or woven metal for moisture or chemical barriers or as electrical insulators, for the "potting" of electronic equipment, for moulding or articles of any desired shape by the usual processes of injection compression or transfer moulding, or as the binders for surface coatings, paints and the like used in solution or in aqueous (latex) dispersion as unsupported transparent film and so on. The elastomeric products are particularly useful for wire insulation, gaskets, O rings, valve diaphragms, hoses and liquid containers and the like.

The copolymers may consist of aggregates of linear chains as is the case with those of most monofunctional co-monomers such as methyl methacrylate. In this case they are soluble in appropriate solvents, particularly of the type with a medium solvent parameter as defined by Burrell (Official Digest, Federation of Paint and Varnish Clubs, October 1955, p. 726) and the high polymers are thermoplastic. They may also be branched or even cross-linked in character due to polyfunctionality on the part of one of the co-monomers, such as 1:3 butadiene, divinyl benzene, glycol dimethacrylate, divinyl sebacate and so on, or because of chain transfer during reaction of a polymer radical with one of the other chains such as happens with vinyl chloride and with vinyl acetate. These latter are simply branched.

However, it is often convenient to cross-link the copolymer after it had been made, as one vulcanises rubber, or cross-links polyethylene by high energy radiation, to decrease deformation at high temperatures. The copolymers of this invention may be crosslinked in like manner by the methods common to those used for the co-monomer, such as sulphur or peroxide vulcanisation with the butadiene copolymers, polyamine or metal oxide vulcanisation with the acrylate ester copolymers polyamine or perioxide vulcanisation with halo-ethylene copolymers, or high energy radiation with ethylene and many other copolymers and so on. These methods, and others, are well known to the art. The choice depends on the properties required of the products.

*Example 1*

53 parts by weight of octafluoro-cyclo-hexa-1:3-diene and 75 parts by weight of 1:3-butadiene were reacted in a sealed glass tube at 50° C. for 18 hours with continuous agitation in the presence of 180 parts by weight of water, 5 parts by weight of sodium stearate, 0.5 part by weight of n-dodecyl mercaptan and 0.3 part by weight of sodium persulphate.

At the end of this period the tube was opened and unreacted 1:3 butadiene (50 parts by weight) was discharged. The tube contained a white solid elastomeric copolymer together with some latex. Virtually all of the octafluoro-cyclo-hexa-1:3-diene charged to the reactor was found to have been consumed in the co-polymerisation reaction.

The elastomeric product was separated by precipitation with dilute hydrochloric acid, washed with water and dried in vacuo to give 76 parts by weight of co-polymeric product contained 43% fluorine as determined by a sodium fusion method.

*Example 2*

224 parts by weight of octafluoro-cyclo-hexa-1:3-diene and 35 parts by weight of 1:3 butadiene was reacted in a sealed glass tube in the presence of the same mixture as in Example 1, and for the same time at the same temperature.

After separation and drying there remained 190 parts by weight of a white elastomeric co-polymer containing about 50% fluorine by analysis by sodium fusion. No unreacted 1:3-butadiene was left and the analysis of the co-polymer corresponds closely to that required for a 1:1 molar co-polymer.

*Example 3*

53 parts by weight of octafluoro-cyclo-hexa-1:4 diene and 75 parts by weight of 1:3-butadiene were reacted in a sealed glass tube in the presence of the same mixture as in Example 1 and for the same time at the same temperature.

Approximately 25 parts by weight of elastomeric co-polymer was produced containing at least 15% fluorine by elemental analysis. Both octafluoro-cyclo-hexa-1:4-diene and butadiene were present at the end of the reaction.

*Example 4*

A solution of 0.741 part by weight of benzoyl peroxide in 4.718 parts by weight of methyl methacrylate was prepared. 0.477 part by weight of this solution was mixed with 5.476 parts by weight of octafluoro-cyclo-hexa-1.3-diene in a glass tube which was then cooled to $-180°$ C., evacuated and sealed.

On melting the frozen liquids after sealing a lump of white solid polymer presumably poly(methylmethacrylate) was observed. On heating at 80° C. a polymeric material rapidly separated and was deposited as a glassy solid on the walls of the tube. After 22 hours the tube was cooled. 4.6 parts by weight of liquid, nearly pure octafluoro-cyclo-hexa-1:3 diene and 0.835 part by weight of solid polymeric material were recovered. Part of the polymeric material was the homopolymer mentioned which was a white granular solid, and the remainder was a glassy flexible solid. Of the remainder, 0.819 part by weight was taken up in 15 parts by weight of chloroform and added with stirring to 450 parts by weight of methylated spirit to deposit 0.308 part by weight of flocculent precipitate of solid high polymer.

Evaporation of the liquors after separation of the solid high polymer by filtration yielded 0.372 part by weight of gummy material.

Elemental analysis yielded the following results:

High polymer F=11.3%
Gummy material F=ca. 26%

*Example 5*

0.483 part by weight of the benzoyl peroxide solution of Example 4 was mixed with 5.722 parts by weight of octafluoro-cyclo-hexa-1:4-diene and the reaction carried out as described in Example 4. 4.8 parts by weight of unreacted 1:4-diene was recovered and 0.577 part by weight of powdery solid high polymer. This solid after dissolution in chloroform and precipitation as in Example 4, gave a product containing 2.1% of fluorine by elemental analysis.

In the above Examples each of the crude products was subjected to exhaustive solvent extraction with benzene-ethanol and trichlorotri-fluoroethane before elemental analysis.

*Examples 6 and 7.—Reaction at 0° C.*

Two glass reactors were charged with the following materials, the quantities being expressed in parts by weight.

|  | Example 6 | Example 7 |
|---|---|---|
| 1:3-Butadiene | 8.22 | 7.4 |
| Octafluoro-cyclo-hexa-1:3-diene | 37 | 22 |
| Water | 100 | 100 |
| Methyl alcohol | 25 | 25 |
| 95% neutralised potassium laurate | 2.5 | 2.5 |
| t-dodecylmercaptan | ca. 0.15 | ca. 0.15 |
| Iso-propyl benzene hydro-peroxide (74.5% concentrate) | ca. 0.08 | ca. 0.08 |
| Ferrous sulphate, heptahydrate [1] | 0.139 | 0.139 |
| Sodium pyrophosphate, decahydrate [1] | 0.223 | 0.223 |

[1] Added as 10 parts of "activator" solution. Stock solution (100 parts) warmed under nitrogen in a 60° C. oven for 45 mins.

After agitation for 16 hours at 0° C., the mixtures were steam distilled to remove unreacted monomers and the latices coagulated in dilute aqueous hydrochloric acid. Yields of 18 and 20 parts respectively of copolymer were obtained. That from Example 6 was hard and fairly rigid after pressing, whereas that from Example 7 was soft and extensible with good recovery.

*Example 8.—Impure octafluoro-cyclo-hexa-1:3-diene*

In this example, a sample of impure octafluoro-cyclo-hexa-1:3-diene was used in order to demonstrate that impure fluorocarbon feedstock could be used. The quantities used (parts by weight) were as follows:

| | |
|---|---|
| 1:3-butadiene | 8.96 |
| Octafluoro-cyclo-hexa-1:3-diene [1] | 56 |
| 5% aqueous sodium stearate | 45 |
| Sodium persulphate | 0.075 |
| n-Dodecylmercaptan | 0.125 |
| Water | 36 |

[1] Approximately 85% active monomer.

After agitation for 18.5 hours at 50° C., the mixture was markedly acidic due to the hydrolysis of acidic oxidation products of the fluorcarbon, but 9.7 parts of hard, tough resinous copolymer were obtained.

Elementary analysis yielded C, 47.1, 46.0%, H, 3.6, 3.4% corresponding to ca. 40 molar percent of fluorocarbon in the copolymer.

*Example 9*

This example was carried out in the same way and with the same quantities as Example 8, except that 5% aqueous sodium pentadecafluoro-octanoate was used in place of the sodium stearate. The yield of polymeric material was 7.4 parts, with elementary analysis C, 44.5, 44.0%; H, 2.8, 2.4% corresponding to ca. 44 molar percent of fluorocarbon in the copolymer.

*Examples 10 and 11*

This pair of duplicate preparations utilised octafluoro-cyclo-hexa-1:3-diene prepared in a highly purified state by separation from other compounds on a gas-liquid chromatography column. The quantities were as follows (parts by weight).

| | |
|---|---|
| 1:3-butadiene | 157 |
| Octafluoro-cyclo-hexa-1:3-diene | 1000 |
| Sodium stearate | 40 |
| n-Dodecylmercaptan | 2.2 |
| Sodium persulphate | 1.3 |
| Sodium borate | 10 |
| Water | 800 |

Polymerisation at 51° C. for 17.5 hrs. yielded, after the normal method of isolation, 680 and 775 parts of copolymer with elementary analysis as follows: C, 43.7, 44.3%; H, 2.0, 2.2% and C, 44.4, 44.4%; H, 2.8, 2.7% respectively corresponding to compositions of 46 and 42 molar percent of combined fluorocarbon. The materials were pressed between polished plates at 100° C. and ca. 1 ton/sq. in., yielding flexible, resinous sheets.

*Examples 12–15*

These examples demonstrate the variation in physical properties which result when the composition of the monomer feed is altered. They also demonstrate that a further type of emulsifier system may be used, yielding latices of high stability to coagulation. The fluorocarbon used in these and in subsequent examples was contaminated by 1H-nonafluoro-cyclo-hex-1-ene which has almost the same boiling point (64–65° C. compared with 63–64° for the fluorocarbon diene). The exact quantity was uncertain, but was of the order of 5% as estimated by gas-liquid chromatography. The molar quantities of fluorocarbon are corrected to allow for 5% of this impurity. A further impurity was the cyclic 1:4-diene, the isomeric monomer, but as it copolymerises with 1:3 butadiene, its presence was disregarded. The surface active agents were "Empicol G" (registered trademark, Marchon Products Ltd.), a concentrated form of sodium lauryl sulphate containing ca. 90% of active material and low in electrolytes, and "Dispersol LN" (registered trademark, Imperial Chemical Industries Ltd.) reputedly a condensation product of formaldehyde with sodium naphthalene sulphonates. Parts by weight are quoted.

| Nominal ratio, 1:3-butadiene to octafluoro-cyclo-hexa-1:3-diene | 35:65 | 39.7:60.3 | 49.9:50.1 | 59.7:40.3 |
|---|---|---|---|---|
| 1:3-Butadiene | 154 | 175 | 220 | 262 |
| Octafluoro-cyclo-hexa-1:3-diene | 1,188 | 1,100 | 914 | 730 |
| "Empicol G" | 112 | 112 | 112 | 112 |
| "Dispersol LN" | 22 | 22 | 22 | 22 |
| Sodium persulphate | 6.7 | 6.7 | 6.7 | 6.7 |
| n-Dodecylmercaptan | 11.2 | 11.2 | 11.2 | 11.2 |
| Water | 950 | 950 | 950 | 950 |

Polymerisation at 50° C. proceeded rapidly, and had gone to a considerable extent after only one hour. With the exception of Example 15, which was allowed to react for 21.5 hrs., each was allowed 6.5 hrs. for reaction. The charges were cooled to 0° C., a few parts of hydroquinone added to stop reaction, excess butadiene vented where present, and unreacted fluorocarbon recovered by steam distillation. The resulting copolymer latices were extremely stable to mechanical shear, and to coagulation in dilute aqueous calcium chloride solution. However, coagulated, dried and pressed copolymer was obtained in each case. The yields, analyses and character of the pressed copolymers were as follows:

| Example | 12 | 13 | 14 | 15 |
|---|---|---|---|---|
| Yield | 700 | 810 | 950 | 820 |
| Analysis: | | | | |
| Carbon, percent | 43.3 | 44.6 | 44.0 | 45.8 |
| Hydrogen, percent | 2.4 | 2.7 | 2.6 | 2.5 |
| Fluorine, percent | 53.3 | 53.0 | 53.4 | 51.8 |
| Composition [1]—Butadiene, Mole percent | 50, 53 | 54, 54 | 53, 53 | 57, 56 |
| cyclo-1:3—$C_6F_8$, Mole percent | 50, 47 | 46, 46 | 47, 47 | 43, 44 |
| Character | Hard, rigid | Stiff, Leathery | Stiff, Leathery | Flexible rubbery |

[1] Calculated from carbon and fluorine analyses respectively.

*Examples 16 and 17*

These examples, similar to Example 15, demonstrate the rapidity of the reaction under these conditions. The proportion of monomers to the other ingredients was unchanged. The latices were readily coagulated in dilute alcoholic calcium chloride solution.

| Example | 16 | 17 |
|---|---|---|
| 1:3-Butadiene | 306 | 265 |
| Octafluoro-cyclo-hexa-1:3-diene | 847 | 756 |
| Ratio (Moles) $C_4H_6:C_6F_8$ | 61.2:38.4 | 60.5:39.5 |
| Time at 50° C., mins | 58 | 27 |
| Yield (parts by weight) | 866 | 657 |
| Yield (percent of total monomers) | 81 | 70 |
| Copolymer Analysis: | | |
| Carbon, percent | 44.6 | 44.2 |
| Hydrogen, percent | 2.8 | 2.6 |
| Fluorine, percent | 52.0 | 53.2 |
| Composition [1]—Butadiene, Mole percent | 54, 53 | 54, 56 |
| cyclo-1:3—$C_6F_8$, Mole percent | 46, 47 | 46, 44 |
| Character | Tough, rubbery | Tough, rubbery |

[1] Calculated from carbon and fluorine analysis respectively.

*Examples 18 and 19*

These examples were prepared using a slightly modified recipe from that of the two previous examples in order to reduce the rate of reaction to a value capable of being controlled more readily in a large batch reactor. A higher butadiene:fluorocarbon ratio was used in order to make still more flexible and rubbery copolymers as follows (parts by weight):

| Example | 18 | 19 |
|---|---|---|
| 1:3-Butadiene | 333 | 302 |
| Octafluoro-cyclo-hexa-1:3-diene | 732 | 667 |
| Ratio (Moles percent) $C_4H_6:C_6F_8$ | 66.5:33.5 | 66.5:33.5 |
| "Empicol G" | 12.5 | 12.5 |
| "Dispersol LN" | 2.47 | 2.44 |
| Sodium persulphate | 1.5 | 1.5 |
| Sodium metabisulphite | 0.79 | 0.79 |
| n-Dodecylmercaptan | 5.0 | 5.0 |
| Water | 870 | 870 |
| Time at 40° C., mins | 190 | 427 |
| Yield (parts by weight) | 365 | 575 |
| Yield percent of monomers charged | 37 | 64 |
| Copolymer analysis: | | |
| Carbon, percent | 44.3 | 44.8 |
| Hydrogen, percent | 2.8 | 2.4 |
| Fluorine, percent | 51 | 53.2 |
| Composition [1]—Butadiene, Mole percent | 53, — | 54, 53 |
| cyclo-1:3—$C_6F_8$, Mole percent | 47, — | 46, 47 |
| Character | | Flexible, soft and rubbery |

[1] Calculated from carbon and fluorine analyses respectively.

EXAMINATION OF COPOLYMER FROM EXAMPLE 2

(a) *Thermal stability.*—A sample of copolymer which had been pressed to a thin sheet was heated at 210° C. whilst a current of air (0.5 l./min.) was passed over it. After an initial loss in weight of ca. 12% due to volatile materials not completely removed by drying, the sample stabilised at 83% of its original weight within a few minutes, and remained substantially unchanged in weight after four hours.

A further sample was heated in high vacuum for 62 hrs. at 148°. It was substantially unchanged in weight and properties except for a slight darkening.

In another experiment, exhaustively dried samples were heated in high vacuum whilst suspended from a quartz spiral spring, and the change in weight noted after one hour at several temperatures. It is apparent that they stabilise at 60–66% loss in weight at temperatures of 500–800° C.

(b) *Resistance to red fuming nitric acid.*—A small sample was warmed for 1.5 hrs. with red fuming nitric acid, but was apparently not seriously affected. A further sample withstood immersion in boiling acid for a few minutes.

(c) *Resistance to solvents.*—A sample was immersed in benzene for one day. The extent of swelling was estimated approximately by weighing the sticky swollen mass, and found to be ca. 130% of the original volume. A further sample was seriously swollen in acetone to a slimy jelly.

TENSILE STRENGTH

A "dumb bell" specimen was made and stretched at room temperature (ca. 23° C.). Its ultimate breaking stress was greater than 1000 p.s.i. whilst the elongation was to 830% of the original length of a section of the specimen.

FURTHER COPOLYMERS OF OCTAFLUORO-CYCLO-HEXA-1:3-DIENE

*Example 20*

Copolymer with styrene. A mixture of 11.8 parts of de-stabilised styrene and 14.4 parts of highly purified octafluoro-cyclo-hexa-1:3-diene with 0.3 part of an azo-type initiator was placed in a closed vessel and heated to 100° C. The viscosity increased appreciably and remained substantially constant after approximately five days. Vacuum distillation yielded ca. 9 parts of low boiling material, and the residue was subjected to molecular distillation in a thin layer of ca. 2 mm. thickness at 140–145° C. for 2 hours, at ca. 10–5 mm. In this way, 3.2 parts of high boiling oil and 13 parts of a brittle resin were obtained. Analysis yielded the values of F=46, 47% and 23% for the oil and the resin respectively, corresponding approximately to 50 and 19 mole percent of combined fluorocarbon respectively.

Example 21

An emulsion polymerisation system was used to prepare copolymer in this example. A stock solution of reagents was made up as follows (parts by weight):

| | |
|---|---|
| "Empicol G" | 25 |
| "Dispersol LN" | 5 |
| Sodium persulphate | 1.5 |
| Water | 1000 |

Using this stock solution, the following mixture was made.

| | |
|---|---|
| Styrene | 8.4 |
| Octafluoro-cyclo-hexa-1:3-diene | 71.7 |
| Stock solution | 45 |
| Water | 45 |

After 67 hrs. agitation at 50° C. the mixture was steam distilled and a separate, heavy layer of polymeric oil was observed in the distillation flask (18 parts). A small quantity of white polymeric solid (ca. 2 parts) was isolated from the aqueous phase by evaporation then extracted with aqueous alcohol to remove surface-active agent impurities, and dried. It had an analysis of C, 57.9%; H, 3.6%; F, 38.3% corresponding approximately to a copolymer containing 38 molar percent of combined fluorocarbon. An X-ray diffraction photograph demonstrated that this material was amorphous.

Example 22

Copolymer with ethyl acrylate. An emulsion system was prepared, as follows (parts by weight):

| | |
|---|---|
| Ethyl acrylate (destabilised) | 150 |
| Octafluoro-cyclo-hexa-1:3-diene | 400 |
| 5% aqueous sodium stearate | 500 |
| Sodium persulphate | 1.5 |
| Sodium metabisulphite | 1.0 |

After agitation for ca. 60 hrs, at 50° C., the mixture was steam stripped to remove unreacted monomer, and the rubbery copolymeric residue washed, dried, etc. giving 94 parts of dried material. Analysis after purification by precipitation from butanone solution in petroleum gave F=22% corresponding approximately to 17.5 mole percent of combined fluorocarbon.

Example 23

A solution copolymerisation with ethyl acrylate, was carried out at 100° C. using 10.1 parts of destabilised ethyl acrylate, 0.29 part of an azo-initiator, and 12.2 parts of octafluoro-cyclo-hexa-1:3-diene, highly purified by gas liquid chromatography. An initial, extremely rapid increase in viscosity was noted within a few minutes, and a further increase noted after 16 hours. Little further increase was observed after seven days. After volatilisation of the unreacted monomers, eventually at 155–160°/ $10^{-5}$ mm. for 3 hrs., in which no ethyl acrylate could be detected by gas liquid chromatography, a residue (ca. 10 parts) was left. This was a pleasantly smelling, very viscous, tacky oil which contained ca. 10% fluorine, i.e. ca. 7.3 mole percent of fluorocarbon.

Example 24

Using a mixture of the stock solution of Example 22 (45 parts by weight), water (45) ethyl acrylate (8.2 parts) and octafluoro-cyclo-hexa-1:3-diene (74.5 parts), and agitation at 50° C. for 67 hours, 8.7 parts of a rubbery copolymer were obtained, and some unreacted fluorocarbon, isolated by steam stripping. Purification by solution in acetone followed by precipitation in methylated spirit gave a sample of copolymer which had the following analysis: C, 52.9%; H, 5.9%; F=18.5%. These correspond approximately to a combined fluorocarbon content of 13.5 mole percent.

Example 25

A copolymer with vinyl chloride was made by agitating the following mixture for 16 hours at 40° C.

| | |
|---|---|
| Vinyl chloride | 74.5 |
| Octafluoro-cyclo-hexa-1:3-diene | 34.8 |
| Sodium pentadecafluoro-octanoate | 5 |
| Sodium persulphate | 0.9 |
| Sodium metabisulphite | 0.1 |
| Silver nitrate | 0.05 |
| Water | 200 |

After steam stripping of unreacted fluorocarbon and vinyl chloride 56 parts of copolymer were obtained. Pressing at 120° C. gave a thin, opalescent slightly flexible thermoplastic sheet. Solution of a small sample in acetone followed by coagulation in petroleum gave an analytical sample with C, 36.1%; H, 3.3%; Cl, 35.9%; F, 24.4%. This corresponds to a fluorocarbon content of 13.6 moles percent.

Example 26

Another copolymer with vinyl chloride was similarly made using the following materials (parts by weight).

| | |
|---|---|
| Vinyl chloride | 125 |
| Octafluoro-cyclo-hexa-1:3-diene | 699 |
| Ammonium pentadecafluoro-octanoate | 50 |
| Sodium persulphate | 10 |
| Water | 2000 |

Agitation at 85° C. for 63.5 hrs. yielded, after steam stripping, (a) a brown brittle resinous material (70 parts) which separated from the aqueous phase, and (b) 362 parts of further similar material after coagulation of the dispersion, drying, etc. Solution in acetone of (b) and precipitation in petroleum yielded an analytical sample.

Analyses were as follows:

| | Copolymer (a) | Copolymer (b) |
|---|---|---|
| Carbon, percent | 34.1 | |
| Hydrogen, percent | 2.0 | |
| Chlorine, percent | 17.3 | 19.4 |
| Fluorine, percent | 48.8 | 45.0 |
| Fluorocarbon (mole percent) | ca. 40 | ca. 38 |

Example 27

A similar preparation to that of Example 26 was made using vinylidene fluoride as comonomer, as follows (parts by weight).

| | |
|---|---|
| Vinylidene fluoride | 78.7 |
| Octafluoro-cyclo-hexa-1:3-diene | 27 |
| Ammonium pentadecafluoro-octanoate | 5 |
| Sodium persulphate | 1 |
| Water | 250 |

Agitation at 96° C. for 16 hrs. followed by monomer removal as usual yielded 10 parts of a resinous polymeric material. Solution in acetone followed by precipitation from petroleum yielded a sample with C, 36.0%; H, 2.1%. This corresponds approximately to a copolymer containing 10 mole percent of combined cyclic fluorocarbon.

Example 28

A mixture of 1:3-butadiene and octafluoro-cyclo-hexa-1:3-diene such that a liquid phase (ca. 2 ml.) was present, was exposed to normal diffuse daylight, for several days in a flask of borosilicate glass (ca. 5.5 l.) in the substantial absence of air. A tough copolymer was formed with analysis C, 47.0%, H, 2.9%. This corresponds approximately to a fluorocarbon content of 40 moles percent.

Example 29

A copolymer with ethylene was made as follows (parts by weight):

| | |
|---|---|
| Ethylene | 50 |
| Octafluoro-cyclo-hexa-1:3-diene | 42.2 |
| Ammonium pentadecafluoro-octanoate | 7.5 |
| Sodium persulphate | 1.0 |
| Water | 400 |

After agitation at 50° C. for 40 hours followed by steam stripping, etc., yielded 40.7 parts of a white powder, which when pressed at ca. 130° C. yielded a brittle thermoplastic sheet. Analysis yielded C, 39.9%; H, 1.6%; F, 59.2%. This corresponds to 27 mole % of combined fluorocarbon.

Example 30

A mixture of vinyl acetate (172 parts by weight), octafluoro-cyclo-hexa-1:3-diene (434 parts) azo-bis-isobutyronitrile (10 parts) and acetone (960 parts) was heated at 50° C. for ten days. Evaporation of the volatile liquids from the mixture yielded 289 parts of crisp solid copolymer. This did not support combustion, and contained ca. 40 moles percent of combined fluorocarbon (C, 41.0%; H, 2.54%).

We claim:

1. A copolymer of octafluorocyclohexa-1:3-diene with at least a molecularly equivalent proportion of a hydrogen-containing polymerizable monomer containing olefinic unsaturation.

2. A copolymer in accordance with claim 1, in which the polymerizable monomer is an ethylenic compound.

3. A copolymer in accordance with claim 1, in which the polymerizable monomer is a vinyl ester.

4. A copolymer in accordance with claim 1, in which the polymerizable monomer is an allyl ester.

5. A copolymer in accordance with claim 1, in which the polymerizable monomer is a linear conjugated diene.

6. A copolymer in accordance with claim 1, in which the polymerizable monomer is a vinyl-substituted aromatic compound.

7. A copolymer in accordance with claim 1, in which the polymerizable monomer is an $\alpha,\beta$-unsaturated carboxylic acid derivative.

8. A copolymer in accordance with claim 1, in which the polymerizable monomer is a vinyl ether.

9. A copolymer of octafluorocyclohexa-1:3-diene with at least a molecularly equivalent proportion of a hydrogen-containing polymerizable monomer selected from the group consisting of ethylene, 1:3-butadiene, vinyl chloride, vinyl acetate, vinylidene fluoride, styrene, methyl methacrylate, ethyl acrylate, and acrylonitrile.

References Cited in the file of this patent

UNITED STATES PATENTS

| | | |
|---|---|---|
| 2,432,997 | Ligett et al. | Dec. 23, 1947 |
| 2,446,382 | Mochel | Aug. 3, 1948 |
| 2,750,431 | Tarrant et al. | June 12, 1956 |